United States Patent
Ishikawa

(10) Patent No.: US 9,389,813 B1
(45) Date of Patent: Jul. 12, 2016

(54) POWER CONSERVATION IN AN IMAGE FORMING APPARATUS BY DELAYING ACTIVATION OF A PRINTING DRUM

(71) Applicant: International Business Machines Corporation, Armonk, NY (US)

(72) Inventor: Takuya Ishikawa, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/055,936

(22) Filed: Feb. 29, 2016

Related U.S. Application Data

(63) Continuation of application No. 14/958,955, filed on Dec. 4, 2015.

(51) Int. Cl.
*G06F 3/12* (2006.01)
*G06K 15/00* (2006.01)
*G06F 1/32* (2006.01)

(52) U.S. Cl.
CPC .......... *G06F 3/1221* (2013.01); *G06F 1/3284* (2013.01); *G06F 3/1218* (2013.01); *G06K 15/4055* (2013.01)

(58) Field of Classification Search
CPC ......... G06F 1/32; G06F 1/3284; G06F 1/329; G06F 3/1215; G06F 3/1217; G06F 3/1218; G06F 3/122; G06K 15/4055; G06K 15/406; H04N 1/00891
USPC ................................................ 358/1.14, 1.15
See application file for complete search history.

(56) References Cited

U.S. PATENT DOCUMENTS

| | | | |
|---|---|---|---|
| 5,489,935 A | 2/1996 | Dornier | |
| 6,072,585 A * | 6/2000 | Dutton | B41J 29/393 358/1.1 |
| 8,149,427 B2 | 4/2012 | Inoue et al. | |
| 8,498,011 B2 | 7/2013 | Takahashi | |

(Continued)

FOREIGN PATENT DOCUMENTS

| | | | |
|---|---|---|---|
| JP | 2006159434 A | 6/2006 | |
| JP | 2006260185 A | 9/2006 | |

(Continued)

OTHER PUBLICATIONS

Chae et al., "A Study on a Hybrid Induction Heating System for Laser Printer", IEEE, Power Electronics Specialists Conference, 2006, PESC '06, 37th, IEEE, pp. 1-6, <http://ieeexplore.ieee.org/xpl/articleDetails.jsp?arnumber=1711757&queryText=A+Study+on+a+Hybrid+Induction+Heating+System+for+Laser+Printer&newsearch=true&searchField=Search_All>.

(Continued)

*Primary Examiner* — Eric A Rust
(74) *Attorney, Agent, or Firm* — Steven F. McDaniel

(57) ABSTRACT

A method for minimizing power consumption of a laser printer includes receiving page description language (PDL) data corresponding to a printing task, identifying commands corresponding to the received PDL data, computing a total predicted rendering time corresponding to the identified commands, computing a print deferral time according to the total predicted rendering time wherein the print deferral time corresponds to an amount of time by which printing drum initialization can be deferred without delaying completion of the printing task, and configuring a printing drum to begin operation according to the print deferral time. A computer program product and computer system corresponding to the method are also disclosed.

1 Claim, 4 Drawing Sheets

(56) References Cited

U.S. PATENT DOCUMENTS

| | | |
|---|---|---|
| 8,749,820 B2 | 6/2014 | Nakajima |
| 2011/0242575 A1 | 10/2011 | Owen et al. |
| 2011/0310413 A1 | 12/2011 | Nakao |

FOREIGN PATENT DOCUMENTS

| | | |
|---|---|---|
| JP | 2008060923 A | 3/2008 |
| JP | 2010005911 A | 1/2010 |
| JP | 2010146003 A | 7/2010 |
| JP | 2011024009 A | 2/2011 |
| JP | 2011207224 A | 10/2011 |
| JP | 4920947 B2 * | 4/2012 |
| JP | 2012-196924 A * | 10/2012 |

OTHER PUBLICATIONS

Ishikawa; Takuya, "Improved Power Consumption in Laser Printing", U.S. Appl. No. 14/958,955, filed Dec. 4, 2015, pp. 1-25.

IBM Appendix P, list of patents and patent applications treated as related. Mar. 31, 2016, 2 pages.

\* cited by examiner

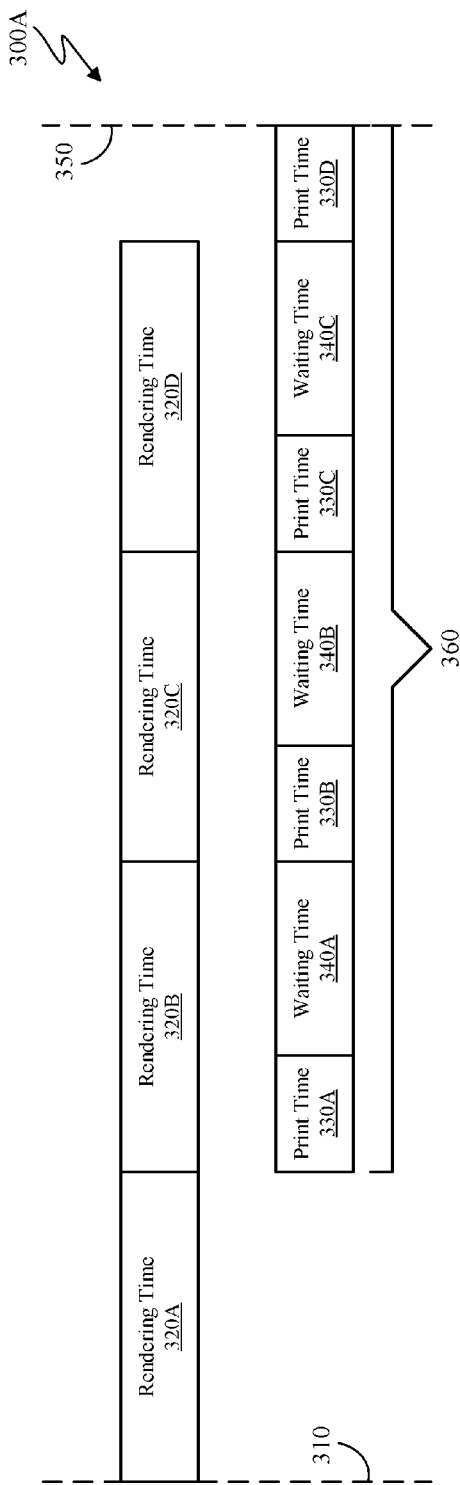
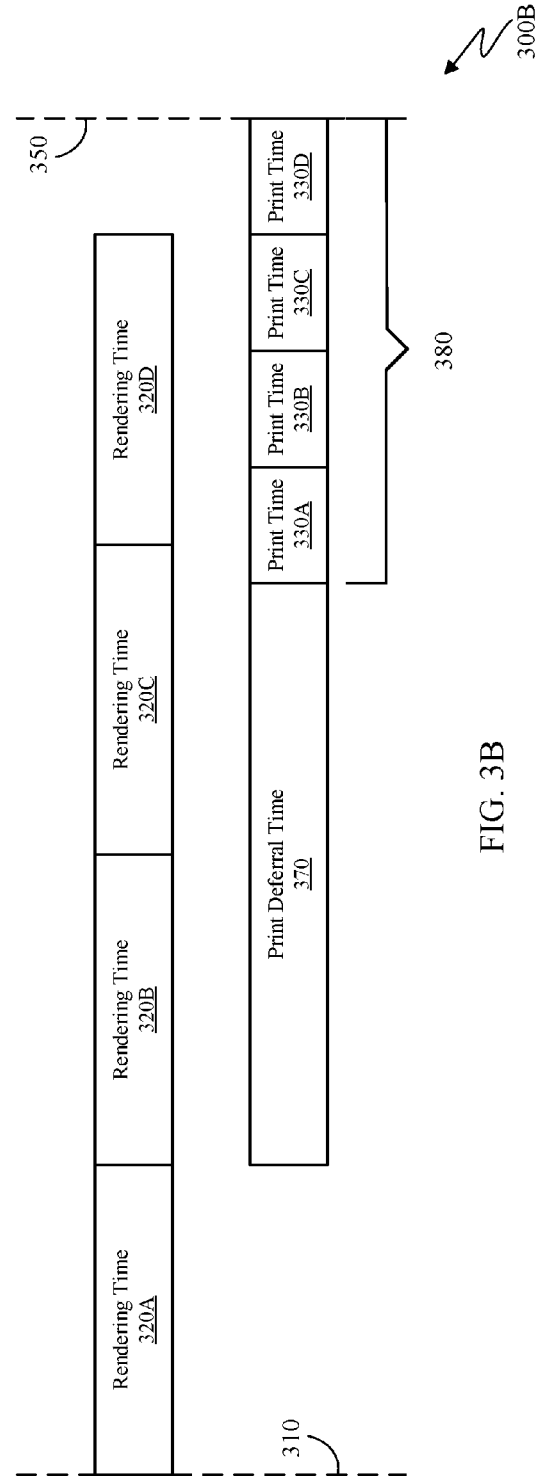
FIG. 3A
FIG. 3B

POWER CONSERVATION IN AN IMAGE FORMING APPARATUS BY DELAYING ACTIVATION OF A PRINTING DRUM

BACKGROUND OF THE INVENTION

The present invention relates generally to the field of laser printing, and more specifically to increasing efficiency in laser printing tasks.

Laser printing is an electrostatic digital printing process which produces texts and graphics by repeatedly passing a laser beam back and forth over a negatively charged cylindrical drum to define a differentially-charged image. The drum then selectively collects electrically charged powdered ink, or toner, and transfers the image to paper, which is then heated in order to permanently fuse the text and/or imagery. Laser printers receive data from a computer, and perform rendering and drum printing on the received data.

SUMMARY

A method for minimizing power consumption of a laser printer includes receiving page description language (PDL) data corresponding to a printing task, identifying commands corresponding to the received PDL data, computing a total predicted rendering time corresponding to the identified commands, computing a print deferral time according to the total predicted rendering time wherein the print deferral time corresponds to an amount of time by which printing drum initialization can be deferred without delaying completion of the printing task, and configuring a printing drum to begin operation according to the print deferral time. A computer program product and computer system corresponding to the method are also disclosed.

BRIEF DESCRIPTION OF THE DRAWINGS

FIG. 3A depicts a laser printing timeline before drum initialization is deferred in accordance with one embodiment of the present invention;

FIG. 3B depicts a laser printing timeline after drum initialization is deferred in accordance with one embodiment of the present invention.

DETAILED DESCRIPTION

A printing drum and associated drum heater are energized only during times of active printing (while paper is moving) and for a few seconds for preheating. The power consumption of the drum and the heater are very large, making it beneficial to minimize the amount of time for which the drum and the heater must be energized. Current laser printing methods require the drum and heater to be operating during some periods when pages are not ready to be printed, which leads to unnecessarily long operation times. The embodiments disclosed herein may enable minimization of a printing drum operation time.

Figure 1:
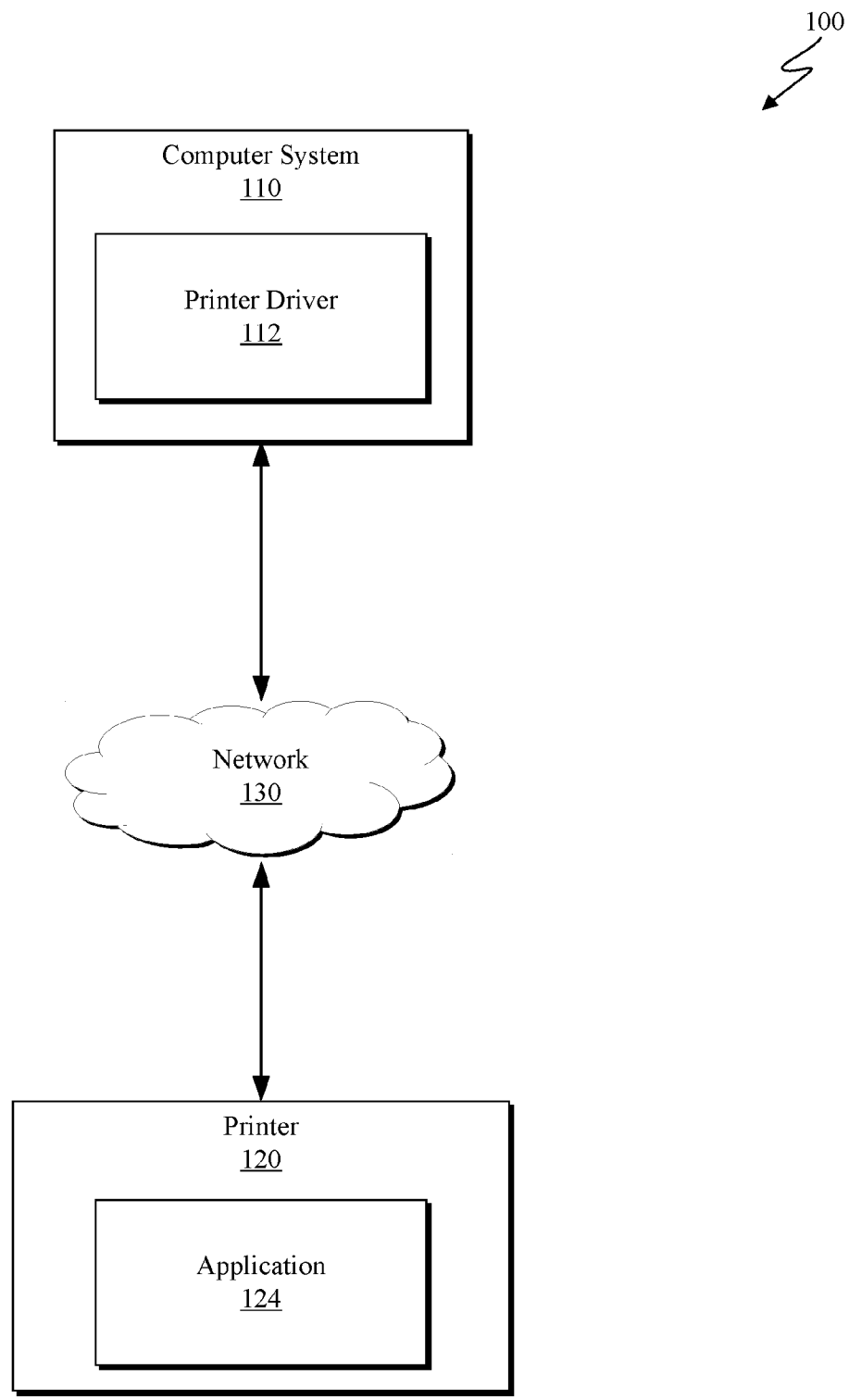
FIG. 1 is a block diagram depicting one embodiment of a laser printing system in accordance with some embodiments of the present invention.

FIG. 1 is a block diagram depicting one embodiment of a laser printing system 100 in accordance with some embodiments of the present invention. As depicted, laser printing system 100 includes a computer system 110, a data source 120, and a network 130. Laser printing system 100 may correspond to a system that can be made more efficient by a drum initialization delay method.

Computer system 110 can be a desktop computer, laptop computer, specialized computer server, or any other computer system known in the art. In some embodiments, computer system 110 represents a computer system utilizing clustered computers and components to act as a single pool of seamless resources when accessed through network 130. In general, computer system 110 is representative of any electronic devices, or combination of electronic devices, capable of executing machine-readable program instructions, as described in greater detail with respect to FIG. 4.

As depicted, computer system 110 may include a printer driver 112. Printer driver 112 may be a piece of software that converts data to be printed to a form specific to printer 120. Printer driver 112 enables other applications on computing system 110 to carry out printing tasks without being aware of the technical details of printer 120. In one embodiment, printer driver 112 is configured to provide page description language data corresponding to a printing task to printer 120.

Printer 120 may be any peripheral which makes a persistent human readable representation of graphics or text on paper or similar physical media. In some embodiments, printer 120 is a laser printer. Printer 120 may be configured to receive a printing task from computer system 110 via network 130. As depicted, printer 120 may include application 124. Application 124 may be configured to execute a drum initialization delay method to limit the power consumption corresponding to printer 120. The details of the drum initialization delay method executed by application 124 are described in greater detail with respect to FIG. 2. It should be appreciated that while FIG. 1 depicts application 124 as existing in printer 120, in other embodiments of the present invention application 124 could be hosted on a computer system instead.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between computer system 110 and printer 120 in accordance with an embodiment of the present invention.

Figure 2:
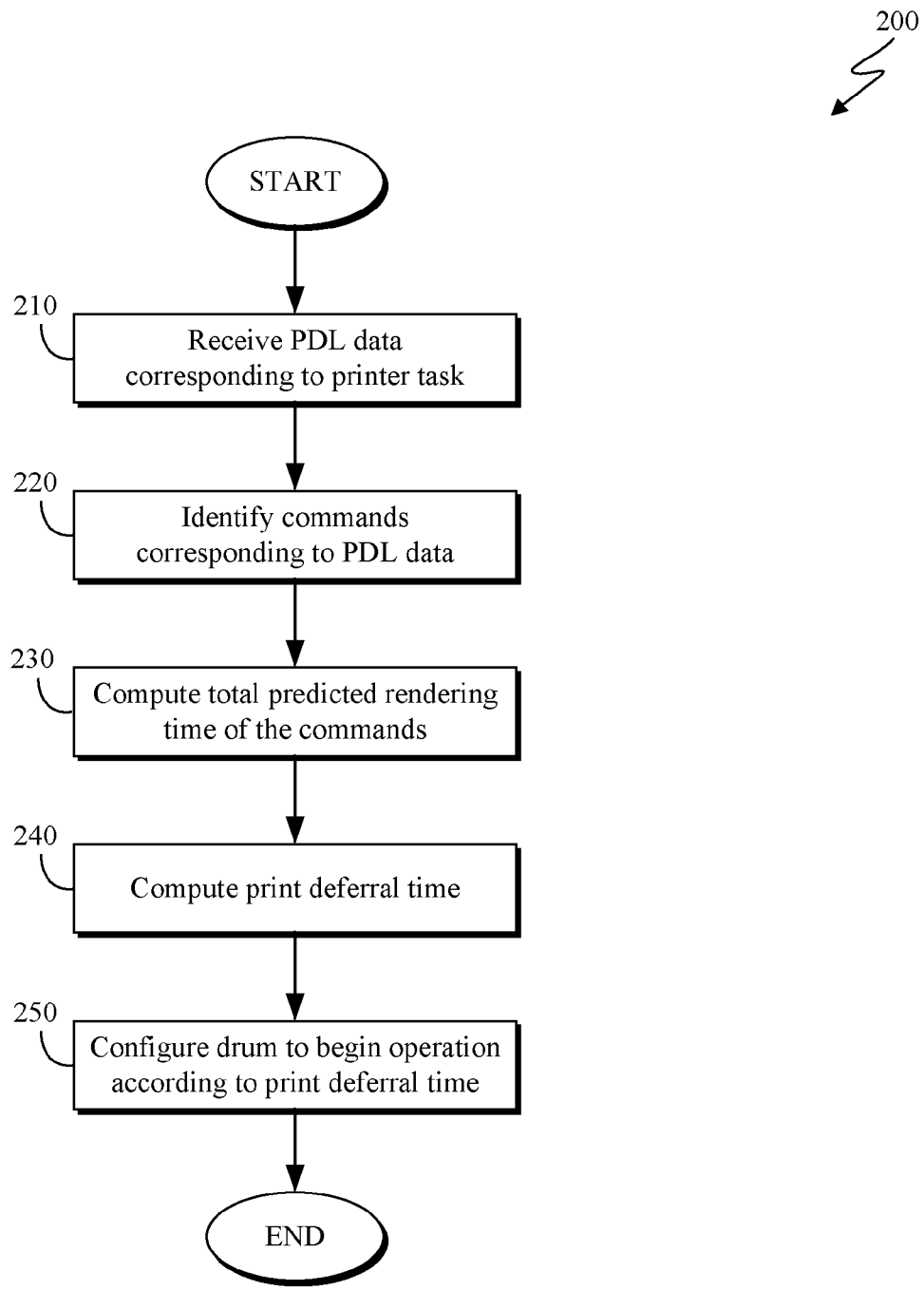
FIG. 2 is a flowchart depicting one embodiment of a drum initialization delay method in accordance with some embodiments of the present invention.

FIG. 2 is a flowchart depicting one embodiment of a drum initialization delay method 200 in accordance with some embodiments of the present invention. As depicted, drum initialization delay method 200 includes receiving (210) page description language data corresponding to a printing task, identifying (220) commands corresponding to the PDL data, computing (230) a total predicted rendering time of the commands, computing (240) a print deferral time, and configuring (250) a printing drum to begin operation at the print deferral time. Drum initialization delay method 200 may enable increased efficiency in laser printing tasks.

Receiving (210) page description language (PDL) data corresponding to a printing task may include receiving PDL data from a printer driver. PDL data is data that describes the appearance of a printed page on a higher level than an actual output bitmap. PDL data may be textual or binary data streams. The received PDL data may include a plurality of fields, including a page number, color information, vector data, and image data corresponding to the printing task. Receiving (210) PDL data may further include dividing the received PDL data based on which page it corresponds to.

Identifying (220) commands corresponding to the PDL data may include analyzing the received PDL data to identify commands indicated by the PDL data. In one embodiment, identifying (220) commands comprises creating a list of all commands indicated by the PDL data and the number of occurrences of each command. The identified commands may be sorted according to the page to which they correspond.

Computing (230) a total predicted rendering time of the commands may include comparing the list of commands to a correspondence table of PDL commands and rendering times. The correspondence table may be a table that has been created in advance by applying PDL commands on a sample data set with respect to the relevant printer and measuring the rendering time associated with each command. For each identified command, a corresponding rendering time is identified within the correspondence table. The sum of the rendering times associated with commands on a page of the printing task may be calculated to provide an estimated rendering time for each page.

Computing (240) a print deferral time may include calculating a time at which a printing drum should begin printing pages corresponding to the printing task. The print deferral time may correspond to an amount of time by which printing drum initialization could be delayed to minimize the power consumption associated with the printing drum without delaying the completion of the printing task. In one embodiment, the print deferral time is applied with respect to an existing printing drum initialization time, which may correspond to the point at which the first page of the printing task has been rendered completely. The print deferral time T may be calculated according to the equation:

$$T = R_2 + R_3 + \ldots + R_N - (D_1 + D_2 + \ldots + D_{N-1}) \quad (1)$$

With respect to equation 1, $R_N$ corresponds to a rendering time associated with an nth page of the printing task, $D_N$ corresponds to a drum printing time associated with an nth page of the printing task, and N corresponds to the total number of pages in the printing task. In some embodiments, the drum printing time is constant for all pages regardless of content, in which case the print deferral time T may be calculated according to the simplified equation:

$$T = R_2 + R_3 + \ldots + R_N - (N-1)*D \quad (2)$$

Configuring (250) a printing drum to begin operation according the print deferral time may include sending a signal to the printer to begin operating at a point in time indicated by the print deferral time. In some embodiments, the print deferral time is calculated with respect to an existing drum initialization time corresponding to the first page of the printing task being completely rendered. In these embodiments, the printing drum initialization time to is calculated according to the equation:

$$t_0 = R_1 + T \quad (3)$$

With respect to equation (3), $R_1$ corresponds to the time taken to render the first page of the printing task, and T corresponds to the print deferral time as calculated according to equation (1) or equation (2).

FIG. 3A depicts a laser printing timeline 300A before drum initialization is delayed in accordance with one embodiment of the present invention. As depicted, laser printing timeline 300A includes a starting time 310, rendering times 320, print times 330, waiting times 340, completion time 350, and printing drum engagement duration 360. Laser printing timeline 300A depicts the waiting times associated with initializing a printing drum as soon as a first page of a printing task has rendered.

Starting time 310 corresponds to a point at which a printer begins rendering a printing task. At starting point 310, the printer begins rendering the first page, as indicated by rendering time 320A. Rendering times 320A, 320B, 320C, and 320D correspond to times associated with rendering pages 1, 2, 3, and 4, respectively. Similarly, print times 330A, 330B, 330C, and 330D correspond to times associated with physically printing pages 1, 2, 3, and 4, respectively.

Waiting times 340 correspond to periods of time during which the printing drum remains active but is unable to begin printing a next page. As depicted, the printing time 330 associated with each page is significantly shorter than the associated rendering time 320. For this reason, once a page is finished printing, the printing drum is forced to wait until a next page has finished rendering before it can begin printing a next page. The drum must be kept revolving and heated throughout the duration of the printing task, and therefore remains engaged during these wait times despite not being actively used. Completion time 350 corresponds to a point at which the printer has finished printing all pages associated with the printing task, and the point at which the printing drum is disengaged. Printing drum engagement duration 360 corresponds to the period of time during which the printing drum is revolving and heated.

FIG. 3B depicts a laser printing timeline 300B after drum initialization is delayed in accordance with one embodiment of the present invention. Laser printing timeline 300B corresponds to the same printing task as laser printing timeline 300A, except with respect to laser printing timeline 300B, a printing drum initialization delay method has been implemented. As depicted, laser printing timeline 300B includes starting point 310 and completion point 350, indicating that the duration of the printing job has not increased with the delay of the printing drum initialization. Laser printing timeline 300B also includes the same rendering times 320 as laser printing timeline 300A. However, as depicted with respect to laser printing timeline 300B, a print deferral time 370 has been introduced such that print time 330A doesn't occur until much later in the process. Deferring the printing in this manner allows the four pages to be printed in immediate succession, leaving no unnecessary waiting time and therefore creating a shortened printing drum engagement duration 380. With respect to the depicted embodiment, print deferral time 370 is calculated according to equation (2).

Figure 4:
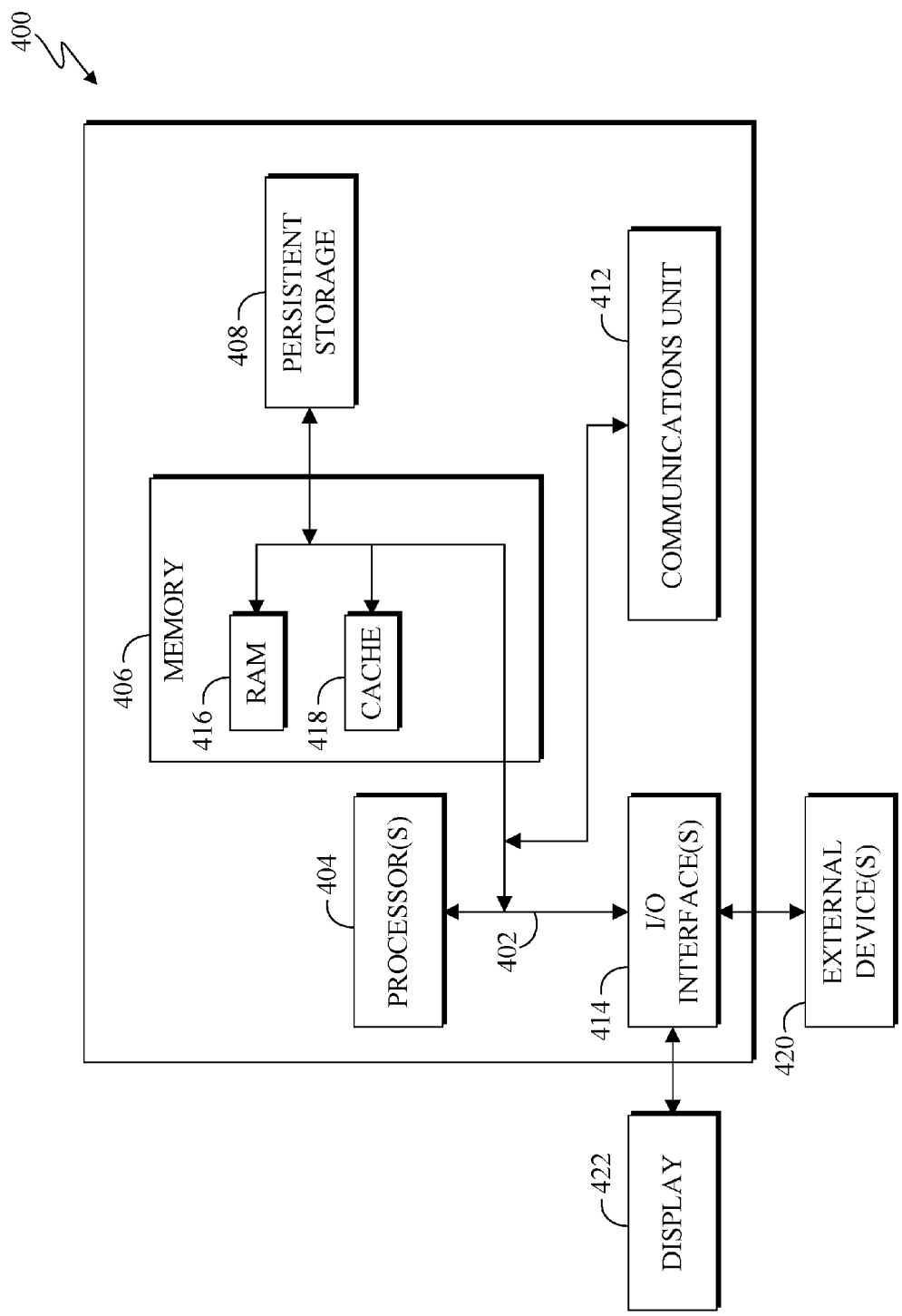
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

executing a set of possible commands in a printer rendering environment and calculating an average rendering time associated with each command of the set of possible commands to provide a rendering time table corresponding to the set of possible commands;

receiving page description language (PDL) data corresponding to a printing task;

identifying commands corresponding to the received PDL data;

computing a total predicted rendering time corresponding to the identified commands by extracting rendering times corresponding to the identified commands from a table indicating average rendering times associated with PDL commands;

computing a print deferral time according to the equation: $T=R_2+R_3+\ldots+R_N-(D_1+D_2+\ldots+D_{N-1})$, wherein T corresponds to an amount of time by which a printing drum initialization can be deferred without delaying completion of the printing task, Rn corresponds to a rendering time associated with an nth page of the printing task, Dn corresponds to a drum printing time associated with an nth page of the printing task, and N corresponds to the total number of pages in the printing task;

configuring a printing drum to begin operation according to the print deferral time; and executing the received printing task according to the print deferral time.

* * * * *